(12) United States Patent
Pandharipande et al.

(10) Patent No.: US 10,878,251 B2
(45) Date of Patent: Dec. 29, 2020

(54) IMAGE PROCESSING SYSTEM

(71) Applicant: SIGNIFY HOLDING B.V., Eindhoven (NL)

(72) Inventors: Ashish Vijay Pandharipande, Eindhoven (NL); Roger Peter Anna Delnoij, Lommel (BE); Marco Haverlag, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 55 days.

(21) Appl. No.: 15/775,404

(22) PCT Filed: Nov. 4, 2016

(86) PCT No.: PCT/EP2016/076718
§ 371 (c)(1),
(2) Date: May 11, 2018

(87) PCT Pub. No.: WO2017/080929
PCT Pub. Date: May 18, 2017

(65) Prior Publication Data
US 2018/0336420 A1 Nov. 22, 2018

(30) Foreign Application Priority Data
Nov. 12, 2015 (EP) .................................... 15194185

(51) Int. Cl.
*G06F 21/62* (2013.01)
*G06K 9/00* (2006.01)

(52) U.S. Cl.
CPC ..... *G06K 9/00778* (2013.01); *G06F 21/6245* (2013.01); *G06K 9/00362* (2013.01); *G06K 9/00771* (2013.01)

(58) Field of Classification Search
CPC ........ G06N 20/00; G06N 3/08; G06N 3/0454; G06N 3/02; G06N 3/0472; G06N 7/005;
(Continued)

(56) References Cited

U.S. PATENT DOCUMENTS 9,460,615 B2 * 10/2016 Basalamah .......... G08G 1/0116
2002/0165731 A1 11/2002 Dempsey
(Continued)

FOREIGN PATENT DOCUMENTS

| JP | 2000223282 A | 8/2000 |
|---|---|---|
| WO | 2012056443 A2 | 5/2012 |
| WO | 2014119991 A1 | 8/2014 |

OTHER PUBLICATIONS

X. Liu et al., "Detecting and Counting People in Surveillance Appliances," IEEE Conference on Advanced Video and Signal Based Surveillance, 2005 (6 Pages).
(Continued)

*Primary Examiner* — Quan M Hua
(74) *Attorney, Agent, or Firm* — Meenakshy Chakravorty (57) ABSTRACT

In a people counting system, a plurality of vision sensors is arranged to provide sensor coverage of an area. Each is arranged to provide individual sensor coverage of a portion of the area within its field of view. Each of a plurality of local image processors is connected to a respective one of the vision sensors. Each of the local image processors is configured to apply a local person detection algorithm to at least one image captured by its respective vision sensor, thereby generating a local presence metric representative of a number of people detected in the at least one image. A central processor is configured to estimate the total number of people in the area covered by the vision sensors by applying an aggregation algorithm to the local presence metrics generated by the local image processors. As it is critical that user privacy be taken into account when utilising such
(Continued)

people counting technology, an opt-out is enabled. For instance, there may be users who do not want to reveal any information that may be perceived give away information related to their presence. In this context, a user is a person in the environment where people counting may be implemented. The disclosure applies not only to people counting, but to other contexts where people may be monitored, for example, a CCTV environment.

12 Claims, 9 Drawing Sheets

(58) Field of Classification Search
CPC .............. G06N 3/088; G06N 5/02; G06T 2207/20081; G06T 2207/20084; G06T 7/0002; G06T 7/0014; G06T 7/20; G06K 9/4628; G06K 2209/05; G06K 9/00369; G06K 9/46; G06K 9/6262; G06K 9/00147
See application file for complete search history.

(56) References Cited

U.S. PATENT DOCUMENTS

| | | | |
|---|---|---|---|
| 2004/0203630 A1* | 10/2004 | Wang | H04M 3/42229 455/414.1 |
| 2005/0012817 A1 | 1/2005 | Hampapur et al. | |
| 2010/0024045 A1* | 1/2010 | Sastry | H04W 12/02 726/28 |
| 2010/0082801 A1* | 4/2010 | Patel | G06Q 10/107 709/224 |
| 2010/0289664 A1 | 11/2010 | Mizushima et al. | |
| 2013/0038694 A1 | 2/2013 | Nichani et al. | |
| 2014/0012400 A1 | 1/2014 | Hidaka et al. | |
| 2014/0222510 A1 | 8/2014 | Martin et al. | |
| 2014/0240493 A1 | 8/2014 | Bang et al. | |
| 2014/0266669 A1 | 9/2014 | Fadell et al. | |
| 2014/0282644 A1* | 9/2014 | Terrazas | H04N 21/442 725/12 |
| 2014/0313032 A1 | 10/2014 | Sager et al. | |
| 2015/0062337 A1 | 3/2015 | Scalisi | |
| 2015/0154404 A1* | 6/2015 | Patel | H05B 47/18 426/26 |

OTHER PUBLICATIONS

Henri Bouma et al., "Real-Time Tracking and Fast Retrieval of Persons in Multiple Surveillance Cameras of a Shopping Mall," Optical Sensing II, May 2013 (13 Pages).

Anonymous, "Definition of a Beacon Controller," Retrieved From Internet: URL:https://en.wikipedia.org/wiki/beacon, Retrieved on Apr. 20, 2016 (4 Pages).

Gian Lluca Foresti, et al., "Multimedia Video-Based Surveillance Systems," Multimedia Video-Based Surveillance Systems, Sep. 2000 (9 Pages).

Antoni B. Chan, et al., "Privacy Preserving Crowd Monitoring: Counting People Without People Models or Tracking," Electrical and Computer Engineering Department, University of California, San Diego, 2008 (7 Pages).

* cited by examiner

IMAGE PROCESSING SYSTEM

CROSS-REFERENCE TO PRIOR APPLICATIONS

This application is the U.S. National Phase application under 35 U.S.C. § 371 of International Application No. PCT/EP2016/076718, filed on Nov. 4, 2016, which claims the benefit of European Patent Application No. 15194185.3, filed on Nov. 12, 2015. These applications are hereby incorporated by reference herein.

TECHNICAL FIELD

The present invention relates to an image processing system, for example for processing image data and extracting information relating to people in an area, such as a people count.

BACKGROUND

A lighting system for illuminating an environment may comprise a plurality of luminaires, each of which, in turn, comprises a light source in the form of one or more lamps that emit configurable illumination into the environment. The lamps may for example be LED lamps, filament bulbs, gas discharge lamps etc.

The luminaires may be inter-connected so as to form a lighting network. In order to control the illumination, a gateway, such as a lighting bridge, may be connected to the network. The gateway can be used to communicate control signals via the network to each of the luminaires, for example under the control of a general-purpose computer device connected to the gateway.

The lighting network may have a mesh topology, whereby the luminaires themselves act as relays within the lighting network, relaying control signals between the gateway and other luminaires in the network. Alternatively, the network may have a star topology, whereby luminaires communicate with the gateway "directly" i.e. without relying on other luminaires to relay the control signals (though possibly via other dedicated network components). Generally, the network can have any suitable network topology e.g. based on a combination of star-like and mesh-like connections. The lighting network may for example operate in accordance with ZigBee protocols.

The luminaires, or more generally the lighting system, may also be equipped with sensor mechanisms. Historically, such sensor mechanisms have been relatively unsophisticated. For example, combinations of timers and motion sensors have been used to selectively activate luminaires in response to recently sensed movement in the environment. An example of such a motion sensor is a passive infra-red ("PIR") motion sensor, which uses infrared radiation emitted from moving bodies to detect their motion.

More modern lighting systems can incorporate sensors into the lighting network, so as to allow the aggregation of sensor data from multiple sensors in the environment. Using suitable sensors, this allows the luminaires to share information on, say, occupancy, activity patterns, changes in temperature or humidity, daylight levels etc. This is sometimes referred to as connected lighting. Sensor signals may be communicated via the lighting network to the gateway, thereby making them available to (say) a general purpose computer device connected to the gateway.

Such sensors have been used in a lighting system to extract information relating to people in the area covered by the lighting system. For example, people counting techniques have been utilised to generate a count of people in the area based on the aggregation of sensor data from individual vision sensors or image capture devices.

SUMMARY

There are a number of applications where the count of people over a particular area may be required. People counting information may be used to enable applications such as safe optimisation, planning and maintenance, HVAC control and data analytics driven marketing. For example, in marketing analysis, people count is needed as one of the input data for analysis. For space optimisation, a count of people in (pseudo) real time is needed to identify temporal and spatial usage patterns.

According to the present disclosure, in such a people counting system an opt-out is enabled. The inventors have appreciated that it is critical that user privacy be taken into account when utilising such people counting technology. For instance, there may be users who do not want to reveal any information that may be perceived to give away information related to their presence. In this context, a user is a person in the environment where people counting may be implemented. The disclosure applies not only to people counting, but to other contexts where people may be monitored, for example, a CCTV environment.

Aspects of the present invention enable users to opt-out of people counting (or any other system where information related to people in the environment is extracted). In some embodiments of the invention described later, this is achieved by indicating their position or location to the system.

According to a first aspect disclosed herein, an image processing system is provided comprising: at least one image capture device arranged to capture images from an area; a first processing module connected to receive image data relating to the captured images of the at least one image capture device and to extract information from the image data relating to people in the area; a second processing module configured to receive from a user device associated with one of the people in the area an opt-out request associated with that person, and to control processing by the first processing module responsive to the opt-out request, to stop extracting information relating to the person associated with the opt-out request.

In embodiments, the image processing system may comprise the user device;

In embodiments, the opt-out request includes location information indicating the actual or estimated location of the person associated with the opt-out request.

In embodiments, the image processing system comprises a plurality of image capture devices arranged to provide coverage of the area, each image capture device arranged to provide individual coverage of a region of the area in its field of view.

In embodiments, the image processing system is also a lighting system and to this end comprises a plurality of luminaires arranged to illuminate the area, wherein each image capture device is co-located with a respective one of the luminaires.

In embodiments, the image processing system comprises a respective beacon controller associated with each luminaire configured to transmit a measurement signal to the user device associated with the opted-out person, whereby the user device is caused to compute an estimate of its location based on measurement signals from at least two beacon controllers, and to generate an opt-out request comprising the estimate of its location.

In embodiments, the image processing system comprises at least one user terminal comprising a display configured to display a plan of the area, to receive an input from the opted-out person identifying his location on the plan and to transmit an opt-out signal comprising location information identifying his location.

In embodiments, the image processing system comprises a vision sensor configured to receive the opt-out signal in the form of a visible signal, and means for estimating the location of an originator of the visible signal to provide the location information indicating the location of an opted-out person.

In embodiments, the vision sensor comprises the image capture device.

In embodiments, the first processing module is configured to extract information to estimate the total number of people in the area.

In embodiments, the first processing module is configured to aggregate image data from the plurality of image capture devices.

In embodiments, the image processing system comprises an image processor local to each image capture device and configured to apply a local person detection algorithm to the captured image data, thereby generating as said image data a local presence metric comprising a presence count indicating a number of people detected in the covered region and a person location identifier identifying a location of each person detected in the covered region.

In embodiments, the image processing system comprises memory having a data field for holding device location identifiers associated with the image capture devices, the data field having an opt-out flag which, when set, causes information associated with the locations matching the device location identifiers to be ignored in extracting information.

In embodiments, each image processor comprises a respective second processing module which is configured to respond to the opt-out request by transmitting to the first processing module, for generating an estimate of the total number of people in the area, the presence count and not the person location identifier of the opted-out person.

In embodiments, each image processor comprises a respective second processing module which is configured to respond to the opt-out request by transmitting to the first processing module updates of the presence count at a first rate, and updates of the person location identifiers for the opted-out person at a second, slower rate.

In embodiments, the opt-out request defines a time period within which the person is opted-out.

According to another aspect disclosed herein, there is provided a method of opting out of a person monitoring system comprising: receiving image data relating to images of an area captured by at least one image capture device; processing the image data to extract information relating to people in the area; receiving from a user device associated with one of the people in the area an opt-out request associated with that person; and controlling the processing of the image data responsive to the opt-out request to stop extracting information relating to the person associated with the opt-out request.

According to another aspect disclosed herein, there is provided a computer program product comprising computer readable instructions which when executed by a processor, implement the steps of receiving from a user device associated with one of the people in the area an opt-out request associated with that person, and controlling the processing of image data captured from the area responsive to the opt-out request, wherein said processing extracts information relating to people in the area, and wherein said controlling stops extracting information relating to the person associated with the opt-out request.

In embodiments, the computer readable instructions additionally cause the steps of receiving the image data relating to images of the area captured by at least one image capture device; and processing the image data to extract information relating to people in the area.

According to another aspect disclosed herein, there is provided a user device for use with an image processing system configured to extract information related to people in an area, the user device comprising: an input component configured to receive an input from a user to select an opt-out such that they are excluded from the people about whom information is extracted; a processor component configured to receive the opt-out selection and to generate an opt-out request; and a transmission component configured to transmit the opt-out request to the image processing system.

In embodiments, the opt-out request may comprise information identifying the location of the user.

In embodiments, the input component comprises a display arranged to display to the user a plan of the area whereby a user may indicate his location on the plan, wherein the information identifying the location of the user is derived from the user indication on the plan.

In embodiments, the transmission component is configured to transmit the opt-out request with a visible signal from which the location of the user can be estimated at the image processing system.

In embodiments, the user device comprises a location estimation component configured to receive signals from the image processing system and to derive therefrom a location of the user device.

Aspects of the invention can be utilised as part of a smart lighting system with multiple luminaires. The user may indicate his/her position to the lighting system. The position (or location) is indicated with the opt-out request. The system can be implemented in a context where each luminaire has a local processor which receives raw image data from a local image capture device and supplies metrics to a central processor for aggregation. In another context, raw image data is supplied to a central processor which processes the image data and extracts information such as a people count.

BRIEF DESCRIPTION OF FIGURES

For a better understanding of the present invention, and to show how embodiments of the same may be carried into effect, reference is made to the following figures, in which.

DESCRIPTION OF THE PREFERRED EMBODIMENTS

The present disclosure relates to a system and method for enabling users to opt-out of the system which extracts information relating to people in an environment, such as a people counting system, based on multiple image capture devices distributed over space. The image capture devices may take the form of cameras and are referred to herein as vision sensors. The system may be part of a smart lighting system. The opt-out system described herein is primarily location-based. Three embodiments are described for identifying the location of a user who wants to opt-out. In a first embodiment, luminaires have an associated beacon (e.g. coded light, RF) and a co-located vision sensor. The user is equipped with a user device which can make signal measurements related to his or her position (e.g. coded light signals, RF measurement or position estimated itself) and feed this back to the lighting system.

In a second embodiment, a user can point to his/her position in a floor plan and signal location information to the system.

In a third embodiment, the user opts-out by explicitly signalling (e.g. using visible light means) to a sensor in the system. The sensor may be one of the vision sensors/image capture devices or an existing infrared detector in a luminaire.

The opt-out request 80 may be acted on in different ways to enable the opt-out as described in more detail in the following.

One advantage of the arrangement described herein is that an opt-out may be enabled locally to users without affecting system level people counting functionality.

A sensor system formed by multiple vision sensors (also referred to as image capture devices) in a connected system with a central processing unit (also referred to as a people count processor) offers data-enabled applications based on people counting with opt-out. Described below are (a) types of information element that can be used to be communicated from the vision sensors to the central processing unit, (b) meta-data elements that are made available at the central processing unit (and vision sensors), and (c) associated methods to enable an opt-out from the people counting method for individual users. The system is a connected lighting system, comprising multiple luminaires, with the vision sensors at the luminaires that are connected to the central processing unit in order to count people in a given region. The vision sensors are connected to the central processing unit via a bi-directional communication link.

Figure 1:
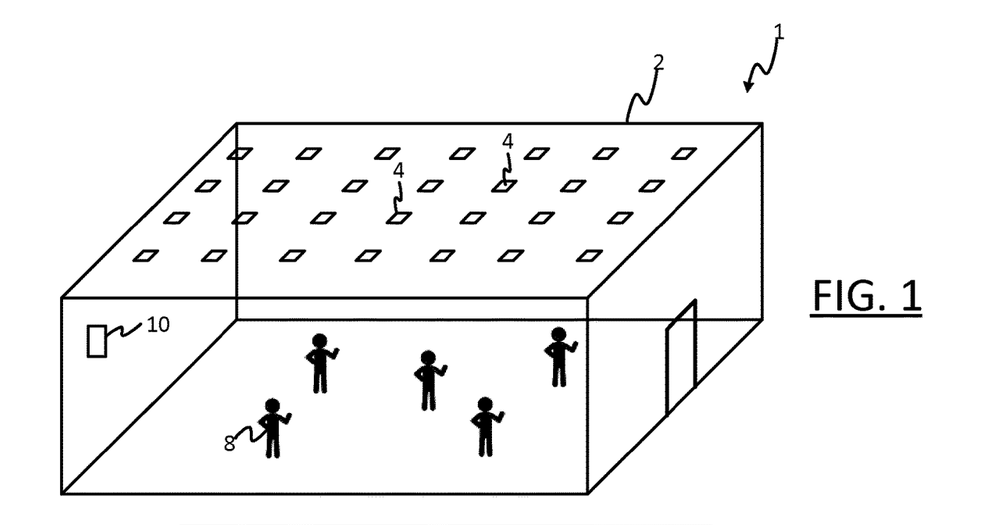
FIG. 1 is a schematic illustration of a lighting system.

FIG. 1 illustrates an exemplary lighting system 1, which comprises a plurality of luminaires 4 installed in an environment 2, arranged to emit light in order to illuminate that environment 2. A gateway 10 is shown, to which each of the luminaires 4 is connected. The gateway 10 effects control of the luminaires 4 within the lighting system 1, and is sometimes referred to as a lighting bridge.

In this example, the environment 2 is an indoor space, such as one or more rooms and/or corridors (or part thereof), or a partially-covered space such as a stadium or gazebo (or part thereof). The luminaires 4 are ceiling-mounted, so as to be able to illuminate the ground (e.g. floor) below them. They are arranged in a grid along two mutually perpendicular directions in the plane of the ceiling, so as to form two substantially parallel rows of luminaires 4, each row being formed by multiple luminaires 4. The rows have an approximately equal spacing, as do the individual luminaires 4 within each row.

Multiple people 8 are shown in the environment, standing on the floor directly below the luminaires 4.

Figure 2:
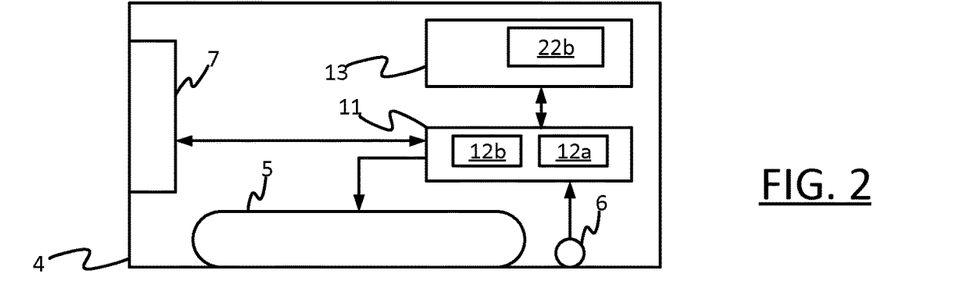
FIG. 2 is a schematic block diagram of a luminaire.

FIG. 2 shows a block diagram of a luminaire 4, representing the individual configuration of each luminaire 4 in the lighting system 1. The luminaire 4 comprises at least one lamp 5 such as an LED-based lamp (one or more LEDs), gas-discharge lamp or filament bulb, plus any associated housing or support. The luminaire 4 also comprises a vision sensor 6 in the form of a camera, which is collocated with the lamp 5; a local processor (formed of one or more processing units, e.g. CPUs, GPUs etc.) 11; a network interface 7, and a local memory 13 (formed of one or more memory units, such as DMA and/or RAM units) connected to the local processor 11. The camera 6 may is able to detect radiation from the luminaires 4 when illuminating the environment, and is preferably a visible light camera. However, the use of a thermal camera is not excluded.

The vision sensor 6 is connected to supply, to the local processor 11, raw image data captured by the vision sensor 6, to which a local person detection algorithm is applied by local image processing code 12*a* executed on the local processor 11. The local person detection algorithm can operate in a number of ways based on any suitable image recognition techniques (e.g. facial recognition and/or body recognition). Based on this, the local person detection algorithm generates "presence metrics", for use in a determining a person count centrally.

The local processor 11 is connected to the lamp 5, to allow local control code 12*b* executed on the local processor 11 it to control at least the level of illumination emitted by the lamp 5. Other illumination characteristic(s) such as colour may also be controllable. Where the luminaire 4 comprises multiple lamps 5, these may be individually controllable by the local processor 11, at least to some extent. For example, different coloured lamps 5 may be provided, so that the overall colour balance can be controlled by separately controlling their individual illumination levels.

The network interface 7 may be a wireless (e.g. 802.15.4, Thread, ZigBee, Wi-Fi, Bluetooth) or wired (e.g. Ethernet) network interface, and provides network connectivity, whereby the luminaires 4 in the lighting system 4 are able to form a lighting network and thereby connect to the gateway 10. The network can have any suitable network topology, for example a mesh topology, star topology or any other suitable topology that allows signals to be transmitted and received between each luminaire 4 and the gateway 10. The network interface 7 is connected to local processor 11, so as to allow the local processor 11 to receive external control signals via the network. These control the operation of the local control code 12*a*, and thereby allow the illumination of the lamp 5 to be controlled externally. This connection also allows the local processor 11 to transmit images captured by the vision sensor 6, to which the image quantization has been applied by the local image processing code 12*a*, to an external destination via the network.

Figure 3:
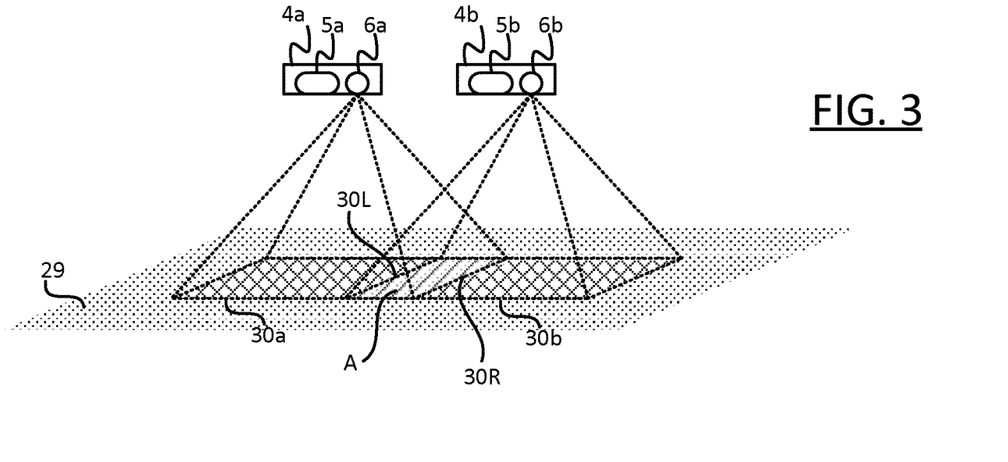
FIG. 3 is a perspective view of a pair of adjacent luminaires.

FIG. 3 shows a perspective view of a first and a second of the luminaires (4*a*, 4*b*), comprising first and second light sources 5*a*, 5*b* and first and second vision sensors 6*a*, 6*b*, as described above. The first and second luminaires 4*a*, 4*b* are neighbouring luminaires i.e. adjacent one another in the grid, along one of the directions of the grid or along one of the diagonals of the grid.

The respective lamp 5a, 5b of each of the luminaires 4a, 4b is arranged to emit illumination towards a surface 29 (the floor in this example), thereby illuminating the surface 29 below the luminaires 4. As well as illuminating the environment, the illumination provided by the luminaires 4 renders the people 8 detectable by the vision sensors 6.

The respective vision sensor 6a, 6b of each luminaire 4a, 4b has a limited field of view. The field of view defines a volume of space, marked by dotted lines in FIG. 3, within which visible structure is detectable by that vision sensor 6a, 6b. Each vision sensor 6a, 6b is positioned to capture images of the respective portion (i.e. area) 30a, 30b of the surface 29 that is within its field of view ("sensing area"), directly below its respective luminaire 4a, 4b. As can be seen in FIG. 3, the fields of view of the first and second vision sensors 4a, 4b overlap in the sense that there is a region of space within which structure is detectable by both vision sensors 6a, 6b. As a result, one of the borders 30R of the sensing area 30a of the first sensor 6a is within the sensor area 32b of the second sensor 6b ("second sensing area"). Likewise, one of the borders 30L of the sensor area 32b of the second sensor 6b is within the sensor area 30a of the first sensor 6a ("first sensing area"). An area A is shown, which is the intersection of the first and second sensor areas 30a, 30b. The area A is the part of the surface 29 that is visible to both of the first and second sensors 6a, 6b ("sensor overlap").

Figure 3A:
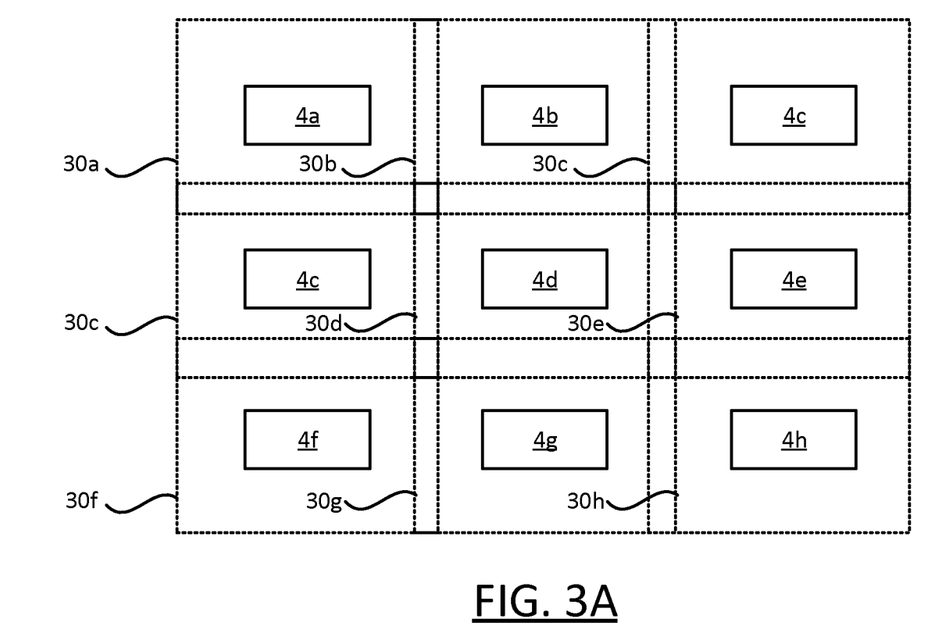
FIG. 3A is a plan view of part of a lighting system.

FIG. 3A shows a plan view of a part of the lighting system 1, in which a 3×3 gird of nine luminaires 4a, . . . , 4h is shown, each having a respective sensor area 30a, . . . , 30h, which is the sensor area of its respective vision sensor as described above. The sensing area of each luminaire overlaps with that of each of its neighbouring luminaires, in both directions along the gird and both directions diagonal to the grid, as shown. Thus every pair of neighbouring luminaires (4a, 4b), (4a, 4c), (4a, 4d), (4b, 4c), . . . has an overlapping sensor area. The overlapping FoVs/sensing areas of the vision sensors ensure that there are no dead sensing regions.

Although nine luminaires are shown in FIG. 3A, the present techniques can be applied to lighting systems with fewer or more luminaires.

Figure 4:
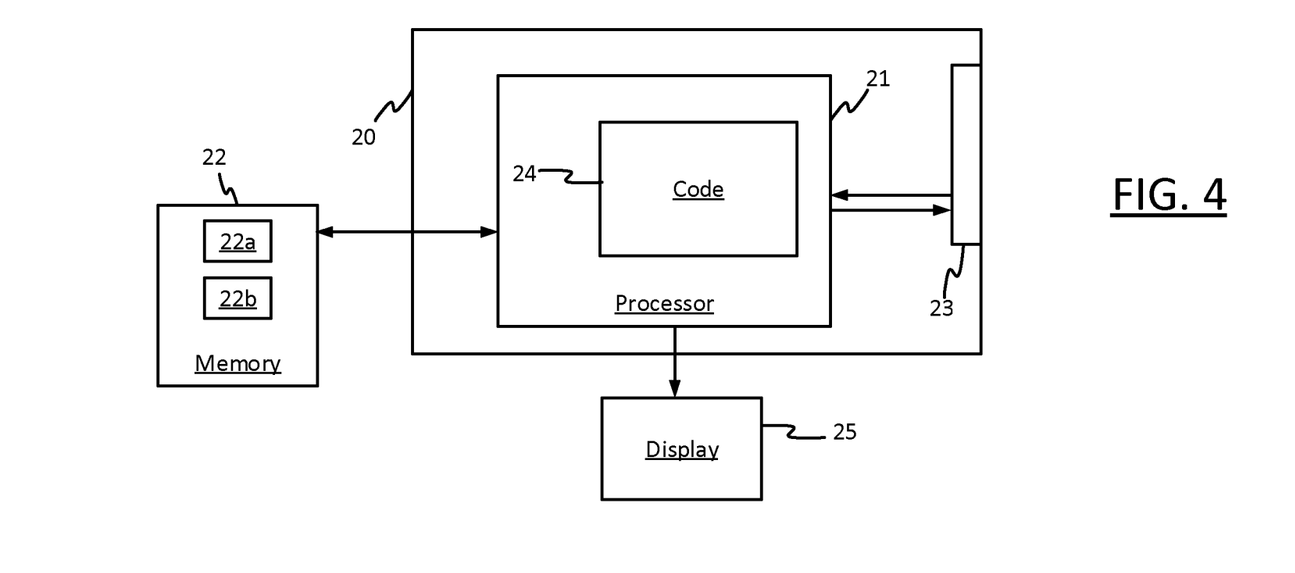
FIG. 4 is a schematic block diagram of a central processing unit for operating a lighting system.

FIG. 4 shows a block diagram of a central processing unit 20. The central processing unit is a computer device 20, such as a server, for operating the lighting system 1. The central processing unit 20 comprises a processor 21 (central processor), formed of e.g. one or more CPUs; and a network interface 23. The network interface 23 is connected to the central processor 21. The central processing unit 21 has access to a memory, formed of one or more memory devices, such as DMA and/or RAM devices. The memory 22 may be external or internal to the computer 20, or a combination of both (i.e. the memory 22 can, in some cases, denote a combination of internal and external memory devices), and in the latter case may be local or remote (i.e. accessed via a network). The processor 20 is connected to a display 25, which may for example be integrated in the computer device 20 or an external display.

The processor 21 is shown executing lighting system management code 24. Among other things, the lighting management applies an aggregation algorithm, to aggregate multiple local presence metrics received from different luminaires 4 so as to generate an estimate of the number of people 8 in the environment. In this way the processor implements a first processing module connected to receive image data relating to the captured images of the image capture device and to extract information from the image data relating to people in the area.

The network interface 23 can be a wired (e.g. Ethernet, USB, FireWire) or wireless (e.g. Wi-Fi, Bluetooth) network interface, and allows the central processing unit 20 to connect to the gateway 10 of the lighting system 1. The gateway 10 operates as an interface between the central processing unit 20 and the lighting network, and thus allows the central processing unit 20 to communicate with each of the luminaires 4 via the lighting network. In particular, this allows the central processing unit 20 to transmit control signals to each of the luminaires 4 and receive images from each of the luminaires 4. The gateway 10 provides any necessary protocol conversion to allow communication between the central processing unit 20 and the lighting network.

Note that FIGS. 2 and 4 are both highly schematic. In particular, the arrows denote high-level interactions between components of the luminaire 4 and central computer 20 and do not denote any specific configuration of local or physical connections.

Figure 4A:
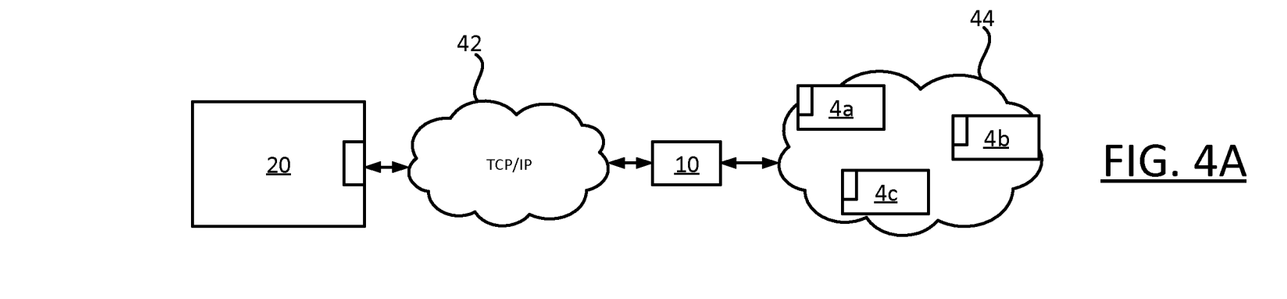
FIG. 4A is a schematic block diagram illustrating an exemplary control architecture of a lighting system.

FIG. 4A shows an exemplary lighting system control architecture, in which the central processing unit 20 is connected to the gateway 10 via a packet basic network 42, which is a TCP/IP network in this example. The central processing unit 20 communicates with the gateway 10 via the packet based network 42 using TCP/IP protocols, which may for example be effected at the link layer using Ethernet protocols, Wi-Fi protocols, or a combination of both. The network 42 may for example be a local area network (business or home network), the Internet, or simply a direct wired (e.g. Ethernet) or wireless (e.g. Wi-Fi) connection between the central processing unit 20 and the gateway 10. The lighting network 44 is a ZigBee network in this example, in which the luminaires 4a, 4b, 4c, . . . communicate with the gateway 10 using ZigBee protocols. The gateway 10 performs protocol conversion between TCP/IP and ZigBee protocols, so that the central computer 20 can communicate with the luminaires 4a, 4b, 4c via the packet based network 32, the gateway 10 and the lighting network 44.

The memory 22 stores a database 22a. The database 22a contains a respective identifier (ID) of each vision sensor 6 (or each luminaire 4) in the lighting system 1, which uniquely identifies that vision sensor 6 within the lighting system 1, and an associated location identifier 71 of that vision sensor 6; for example, a two dimensional (x,y) or three dimensional location identifier 71 (x,y,z) (e.g. if the vision sensors are installed at different heights). The location identifier 71 may convey only relatively basic location information, such as a grid reference denoting the position of the corresponding luminaire in the grid e.g. (m,n) for the mth luminaire in the nth row, or it may convey a more accurate location of the vision sensor 6 (or luminaire 4) itself, e.g. in meters or feet to any desired accuracy. The IDs of luminaires/vision sensors, and their locations, are thus known to the central processing unit 20.

The memory 22 may also store additional metadata, such as an indication of the sensor overlap A, and any other sensor overlaps in the system. Alternatively or in addition some or all of the metadata 22b may be stored locally at the luminaires 4, as shown in FIG. 2. In this case, each luminaire 4 may only store part of the metadata that applies to that luminaire and its neighbours.

Figure 5:
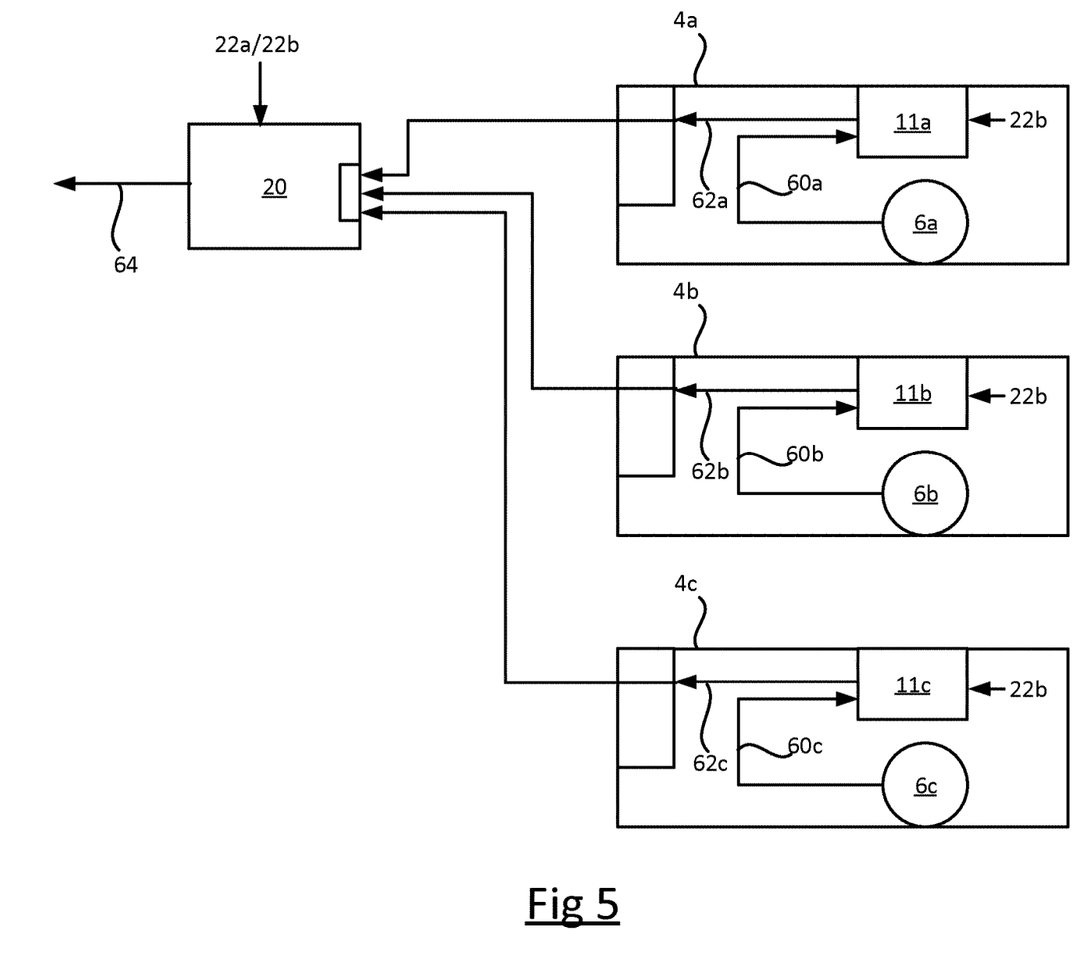
FIGS. 5 and 5A illustrates how local image processors cooperate with a central processing unit to provide a people counting function.
Figure 5A:
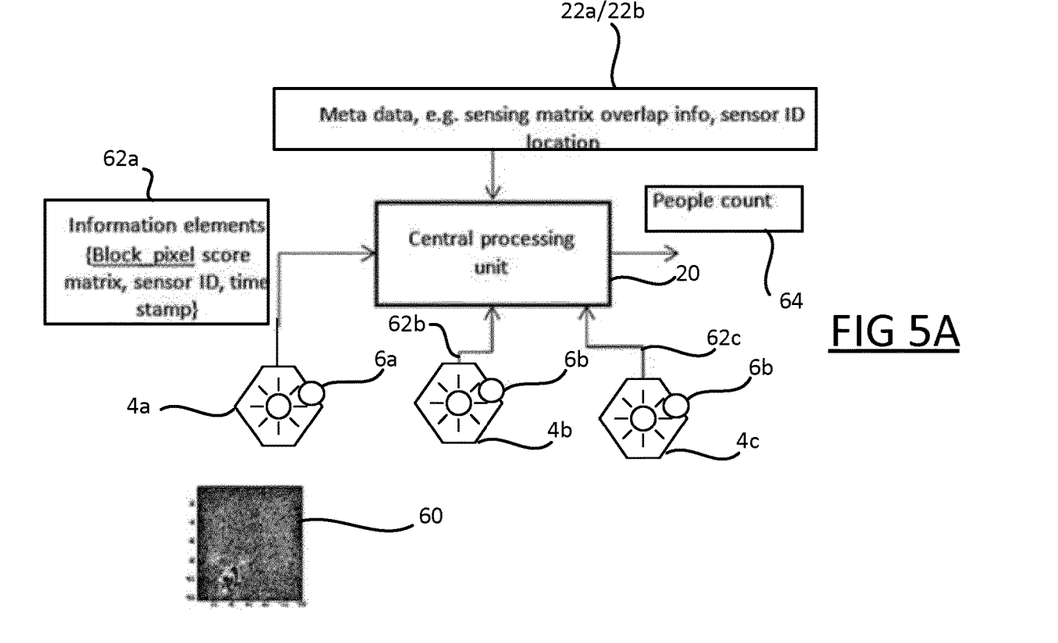

FIGS. 5 and 5A illustrate how the central processor 20 and the luminaires 4 cooperate within the system 1. First, second and third luminaires 4a, 4b, 4c are shown, though this is purely exemplary.

The vision sensors 6a, 6b, 6c of each luminaire captures at least one image 60a, 60b, 60c of its respective sensing area. The local processor 11a, 11b, 11c of that luminaire applies the local person detection algorithm to that image(s). That is, the local person detection algorithm is applied separately at each of the luminaires 4a, 4b, 4c, in parallel to generate a respective local presence metric 62a, 62b, 62c. Each of the local presence metrics 62a, 62b, 62c is transmitted to the central processing unit 20 via the networks 42, 44 and gateway 10. The images 60a, 60b, 60c themselves are not transmitted to the central processing unit 20. In some cases, sensor overlap metadata 22b is used locally at the luminaires 4a, 4b, 4c to generate the local presence metrics.

The central processing unit 20 applies the aggregation algorithm to the presence metrics 62a, 62b, 62c in order to estimate the number of people 8 in the environment. The aggregation algorithm generates an indicator of this number (people count) 64, which is outputted on the display 25 to a user of the central processing unit 20 and/or stored in the memory 22 for later use.

The process may be real-time, in the sense that each local processor 11a, 11b, 11c repeatedly generates and transmits local presence metrics as new images are captured. The people count 64 is updated as the new presence metrics are received, for example one every few (e.g. 10 or fewer) seconds. Alternatively, the process may be pseudo-real-time e.g. such that the people count 64 is updated every minute or every few minutes, or every hour (for example), or it may be pseudo-static e.g. a "one-time" people count may be obtained in response to a count instruction from the user of the computer device 20, to obtain a snapshot of current occupancy levels manually. That is, each count may be instructed manually.

Each presence metric 62 may be generated over a time window i.e. based on multiple images within that time window. This allows movements above a certain speed to be filtered out. I.e. objects moving fast enough to not appear in all of those images may be filtered out so that they do not affect the people count 64.

Figure 6:
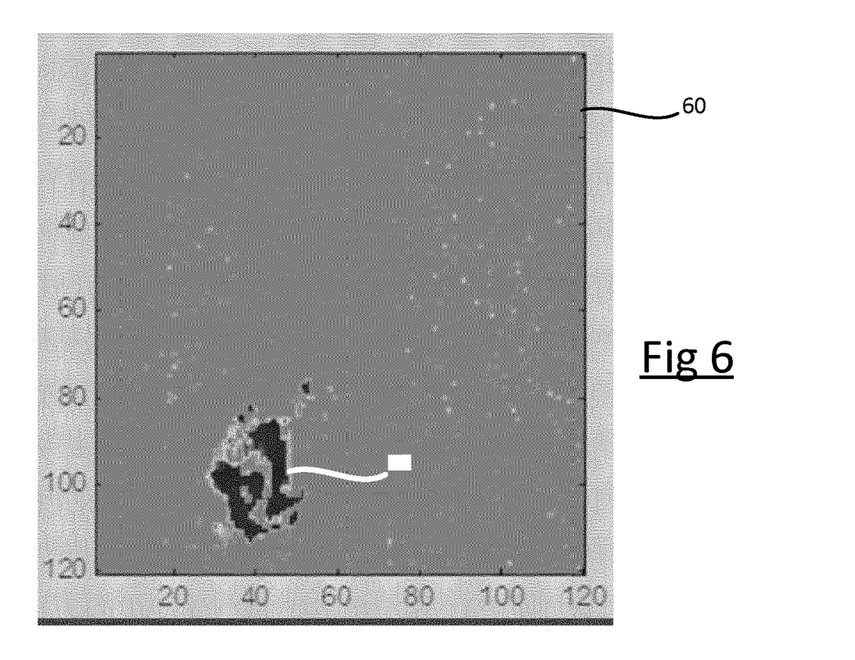
FIG. 6 shows an exemplary image captured by a vision sensor.

FIG. 5A shows an exemplary image 60 captured by the vision sensor 6a of the first luminaire 4a. A larger version of the image 60 is shown in FIG. 6.

In this example, a single person 61 is detectable in the image 60. As discussed, the vision sensor 6a captures images of the part of the surface 29 directly below it, so the image 60a is a top-down view of the person 61, whereby the top of their head and shoulders are visible. Note that, in the case that the person 61 is in the sensor overlap area A, they would be similarly detectable in an image captured by the second luminaire 4b. That is the same person 61 would be simultaneously visible in images from both the first and second luminaires 4a, 4b, at different respective locations in those images.

In embodiments of the present invention, each vision sensor 6 (or rather the local image processor connected to that vision sensor 6) communicates a presence metric, along with its ID and a time stamp, to the central processing unit 20.

Example presence metrics include:

a block_pixel-by-block_pixel score matrix e.g. a 10 by 10 matrix of binary values e.g. with each element a "1" or "0", indicative of presence or no presence; this choice ensures that the communication from the vision sensors to the central processing unit is low rate;

a single location vector e.g. denoting the location of the single person 61 relative to the first vision sensor 6a that captures the image 60;

a score associated to the occupant may be transmitted in association with each location vector. This can be a binary value or more generally, a probability score indicative of the probability that an occupant exists at the said location. The probability score may be computed over a time window, thus filtering out movements above a certain speed. These may be estimated using known statistical methods, e.g. maximum a posteriori (MAP).

The central processing unit 20 collects such metrics from all vision sensors associated with a region over which people count is of interest (e.g. all or part of the surface 29). Additionally, the central processing unit 22 has knowledge of sensing region overlap of the vision sensors, from the metadata 22b. It aggregates the individual vision sensor counts while avoiding double-counts over overlapping regions within a given time window.

A people counting system can be implemented with vision sensors/image capture devices 6. However, it has been perceived by the inventors that it is critical that user privacy be taken into account because users may have perceived concerns regarding privacy. For instance, there may be users that not want to reveal any information that may be perceived to give away information related to their presence. As such, the present disclosure provides a mechanism for such users to opt-out without compromising the people counting functionality at a higher level.

The opt-out can be enforced/implemented in a number of different ways. In a first embodiment, the database 22a has an opt-out field 70 which can be turned on for the location of a user that has made the opt-out request.

In a second embodiment, the local processor 11 which is associated with the particular one of the image capture devices 6 which receives the user opt-out request does not report locations of users that opt-out.

In a third embodiment, for an image capture device 6 associated with a user opt-out, the updating rate of the local processor 11 associated with the image capture device 6 is increased beyond a default value.

Figure 7:
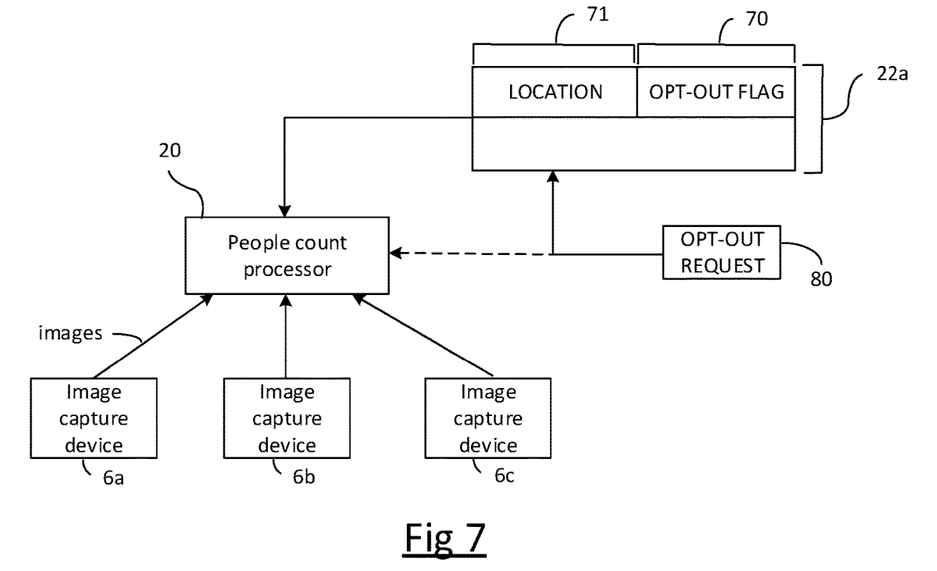
FIGS. 7, 8, 9 and 10 are schematic illustrations of embodiments of the lighting system.

The present disclosure describes two different infrastructures in which the opt-out can be implemented. In a first infrastructure (FIGS. 7 and 8), multiple image capture devices 6 each feed data to a central processing unit. The central processing unit processes the image data, extracts information relating to the people in the area (for example, a people count) and also takes care of implementing the opt-out responsive to an opt-out request (as implemented using one of the example mechanisms described below in relation to FIGS. 11-13). The image data may be raw image data from each image capture device 6 (FIG. 7). Alternatively, the image data may be processed image data in the form of metrics from the local processor 11 associated with each image capture device 6.

In a second infrastructure (FIGS. 9 and 10), each image capture device 6 is associated with a local processor 11 which receives raw image data from the image capture device 6 and provides metrics to the central processing unit. The opt-out request 80 (as implemented using one of the example mechanisms described below in relation to FIGS. 11-13) is received at each local processor 11 in such a way that location information is not provided to the central processing unit at all, or is provided in a manner which disassociates it with the people in the area who have opted-out. This disassociation can be by changing the update rate of location information as compared to the people metrics.

According to the first embodiment as described in FIG. 7, images are uploaded from the local image capture devices 6 to the main processor 20 (the people count processor 20). The people count processor 20 processes the images, extracts data and provides the people count. When a user wishes to opt-out an opt-out request 80 is received by the processor and used to set an opt-out flag in the database 22a attached to the processor (or accessible by it). Then, when the processor is processing the information in the images, it does not use information relating to the locations where the opt-out flag is set.

Figure 8:
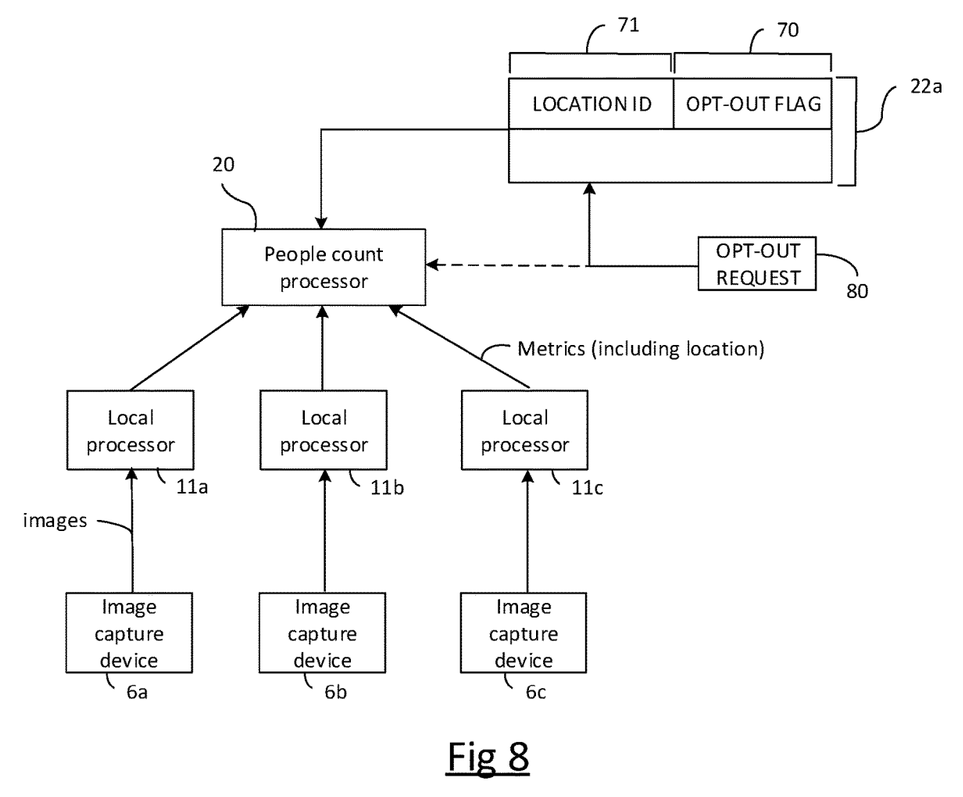

According to another embodiment as described in FIG. 8, each image capture device 6 is attached to its own local processor 11 which processes the images and provides metrics (including location information) for the people count processor 20. When the opt-out request 80 is received, it sets the opt-out flag in the database and then location information included in the metrics which have been sent to the people count processor are no longer taken into account for locations where the opt-out flag is set. That is, all the information (metrics) is provided to the people count processor 20, but metrics pertaining to location may be ignored responsive to an opt-out request, thus maintaining the people counting functionality of the people count processor 20 without violating the user's privacy. For example, a location vector of a user which is included in the metrics for that user may be ignored if the opt-out flag is set for a location ID corresponding to the location vector.

Figure 9:
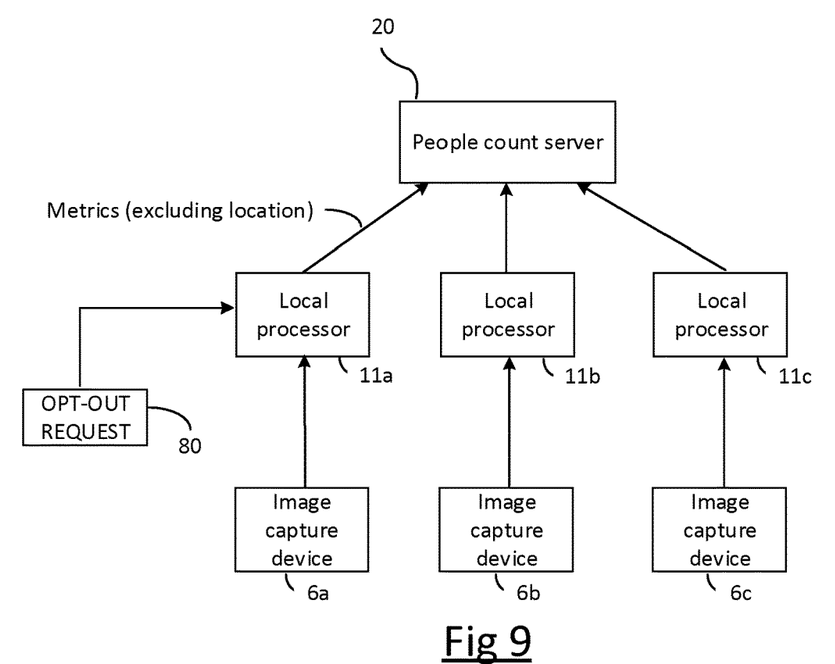
Figure 10:
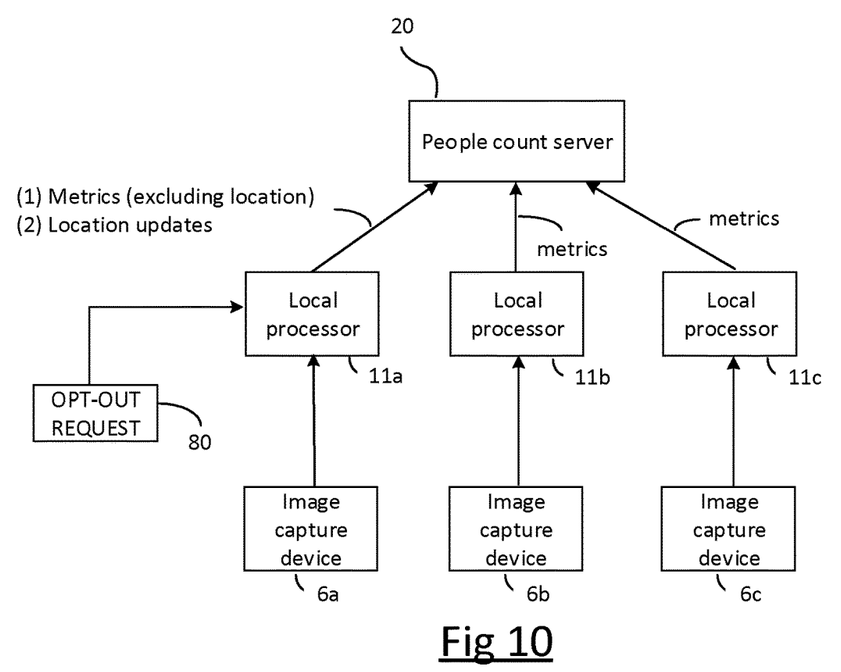

In other embodiments, as for example in FIGS. 9 and 10, it is the local processor 11 which receives the opt-out request 80 and acts on it to control the information which is supplied to the people count processor 20. In this case, a second processing module is implemented in each local processor, while a first processing module which processes the image data is implemented in the people count processor 20. In contrast to the embodiments of FIGS. 7-8, in the example shown in FIG. 9 the people count processor 20 does not receive location information. That is, the local processor 11 which receives the opt-out request filters out identifying information (location metrics) before passing the presence data to the people count processor 20.

The phrase "image data" used herein is used to cover a situation where the image data are images themselves from an image capture device 6, or where the image data comprises metrics provided by local processors 11 from the raw images taken by the image capture devices 6.

In FIG. 9, when an opt-out request 80 is received at the local processor 11, the metrics which are supplied to the people count processor 20 exclude location information. However, it may be desirable for the people count processor 20 to have access to location information as well as the other metrics, whilst still preserving user privacy. To achieve this, the identifying information (such as location information) can be decoupled from the people-related information itself. An example solution to this is shown in FIG. 10.

As mentioned above, the presence information may be provided to the people count server 20 in real or pseudo-real time. In the example shown in FIG. 10, location information may be provided, but updated at a different rate so that it is disassociated with the people-related information in the image data. This means that the people count processor 20 still has access to all the metrics themselves, but in an unrelated form in which the location data of a user is separated from the actual people counting information (e.g. presence or no presence). To implement these aspects of the invention, a first processing module is provided to process the image data to extract information such as a people count. A second processing module receives the opt-out request 80 and implements the opt-out. As is evident from the foregoing description, the first and second processing modules may be in the same processor, or in different processors.

As briefly mentioned above, there are a number of different mechanisms by which a user may indicate his or her location for opting-out. Three embodiments are described for identifying the location of a user who wants to opt out. These embodiments are described with reference to the example mechanisms shown in FIGS. 11-13 (one embodiments per figure). The opt-out system described herein is primarily location-based.

Figure 11:
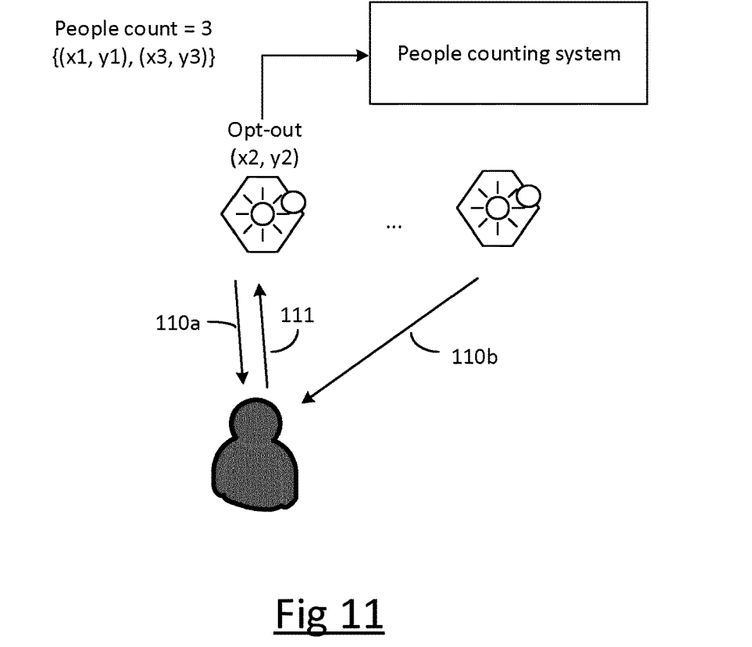
FIGS. 11, 12 and 13 illustrate various mechanisms by which a user may indicate his or her location for opting-out.

According to a first mechanism shown in FIG. 11, luminaires transmit beacon signals 110a, 110b (for example, coded light or RF). The user has a device to make signal measurement related to his/her position using these beacons. The signal measurements may be, for example, coded light signals, RSSI measurements or similar. The user device computes a position estimate based on the signal measurement and supplies this estimated position as part of the opt-out request back to the lighting system, for example, using a coded light signal (illustrated by arrow 111).

Figure 12:
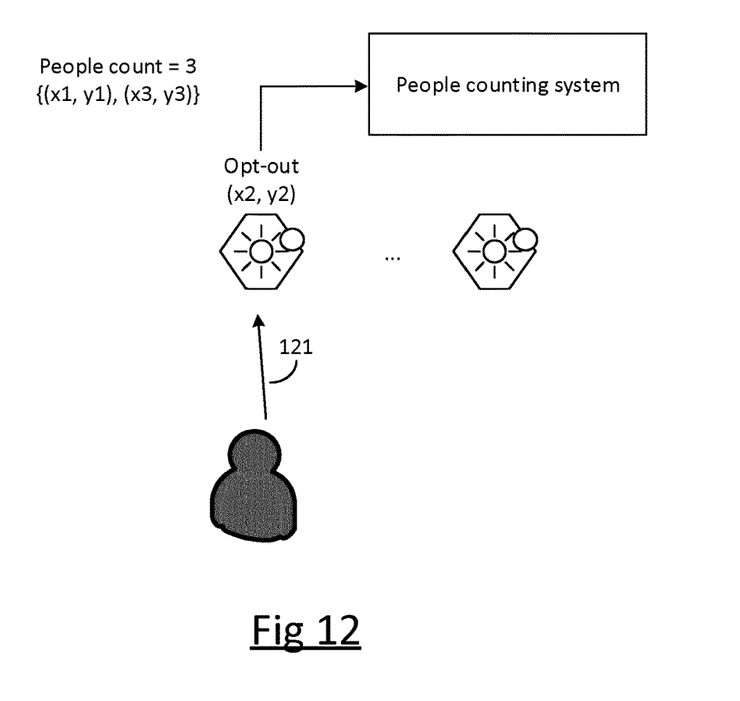

In a second mechanism shown in FIG. 12, a user may have a floor plan displayed on this device and is able to mark his or her location on the floor plan. As illustrated by arrow 121, this location information may then be signalled to the people counting system from the user device, either directly using coded light or via a messaging system through the network.

Figure 13:
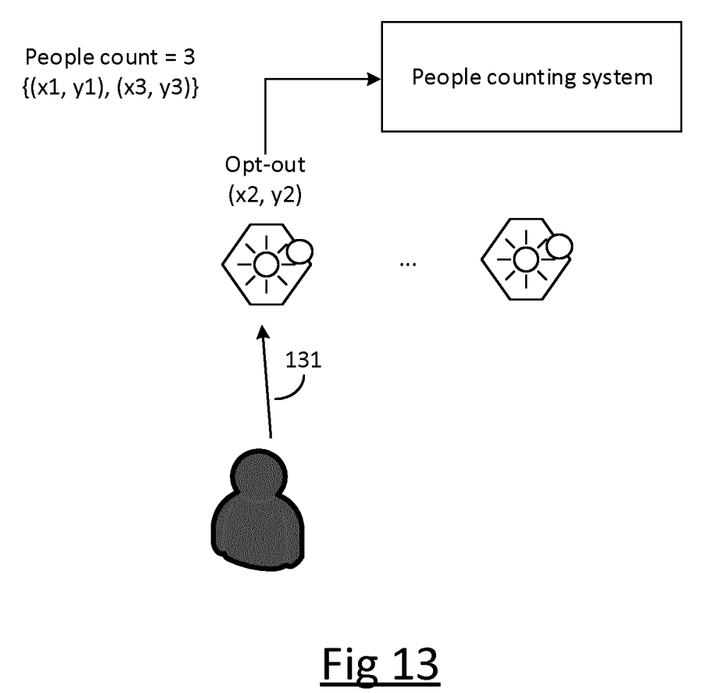

In a third mechanism shown in FIG. 13, a user may opt-out by explicit signalling, for example, using visible light, in which case the opt-out 80 request is a visible light opt-out request 131 which may be captured by a vision sensor/image capture device 6 of the system which can then use this to estimate the location of the originating signal. The estimated location is supplied with the opt-out request. In place of the vision sensor or image capture device 6, the sensor could be an existing infrared director in a luminaire.

As has briefly been described above, there are a number of different mechanisms for enforcing opt-out.

In one mechanism, the central database has an opt-out field that is turned on for locations that have made the opt-out request.

In a second mechanism, the image capture device 6 associated with the user opt-out request does not report the location of users that opt-out only a people count is reported, while opt-out locations are screened.

In a third mechanism, for an image capture device 6 associated with a user opt-out, the image capture location updating rate is increased beyond a default value. The image capture device 6 may still report a people count number as a default rate, while user locations themselves are reported at a much lower update rate. This has a consequence that user tracking is rendered ineffective, while it is still possible to get a count of people.

Whilst the above has been described with reference to an indoor lighting system, with ceiling mounted luminaires arranged in a grid, as will be apparent the techniques can be applied in general to any lighting system (indoor, outdoor or a combination of both), in which vision sensors are deployed. For example, in an outdoor space such as a park or garden. Whilst it can be convenient to collocate the sensors with the luminaires for reasons discussed, this is by no means essential, nor is there any need to have the same number of luminaires and sensors. Moreover, the techniques need not be applied in a lighting system at all.

Moreover, it should be noted for the avoidance of doubt that the above-described architecture is exemplary. For example, the techniques of this disclosure can be implemented in a more distributed fashion, e.g. without the gateway 10 or central processing unit 20. In this case, the functionality of the central processing unit 20 as described above may be implemented by the local processor 11 attached to one of the vision sensors 6 (which may or may not be collocated with a luminaire 4 in general), or distributed across multiple local processors 11.

Furthermore, while the above has been described in terms of the image sensors 6 being conventional visible light cameras, in other embodiments on, some, or all of the image sensors may alternatively or additionally capture their images based on light outside the visible spectrum. E.g. each of one, some, or all of the image sensors 6 may take the form of a thermal camera or thermopile array which capture thermal images based on infrared radiation.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A people counting system comprising:
   at least one image capture device arranged to capture images from an area;
   a first processing module connected to receive image data relating to the captured images of the at least one image capture device and to extract information from the image data relating to people in the area to estimate the total number of people in the area;
   a second processing module configured to receive from a user device associated with one of the people in the area an opt-out request associated with that person, and to control processing by the first processing module responsive to the opt-out request, to stop extracting information relating to the person associated with the opt-out request,
   wherein a respective beacon controller is associated with a respective luminaire configured to transmit a measurement signal to the user device associated with the opted-out person, whereby the user device computes an estimate of its location based on measurement signals from at least two beacon controllers, and generates an opt-out request comprising the estimate of its location.

2. A people counting system according to claim 1, wherein the opt-out request includes location information indicating the actual or estimated location of the person associated with the opt-out request.

3. A people counting system according to claim 1 which comprises a plurality of image capture devices arranged to provide coverage of the area, each image capture device arranged to provide individual coverage of a region of the area in its field of view.

4. A people counting system according to claim 3, the people counting system comprising a plurality of luminaires arranged to illuminate the area, wherein each image capture device is co-located with a respective one of the luminaires.

5. A people counting system according to claim 2, comprising a vision sensor, said vision sensor comprising the image capture device, configured to receive the opt-out signal in the form of a visible signal, and means for estimating the location of an originator of the visible signal to provide the location information indicating the location of an opted-out person.

6. A people counting system according to claim 3, wherein the first processing module is configured to aggregate image data from the plurality of image capture devices.

7. A people counting system according to claim 3, comprising an image processor local to each image capture device and configured to apply a local person detection algorithm to the captured image data, thereby generating as said image data a local presence metric comprising a presence count indicating a number of people detected in the covered region and a person location identifier identifying a location of each person detected in the covered region.

8. A people counting system according to claim 7, which comprises memory having a data field for holding device location identifiers associated with the image capture devices, the data field having an opt-out flag which, when set, causes information associated with the locations matching the device location identifiers to be ignored in extracting information.

9. A people counting system according to claim 8, wherein each image processor comprises a respective second processing module which is configured to respond to the opt-out request by transmitting to the first processing module, for generating the estimate of the total number of people in the area, the presence count and not the person location identifier of the opted-out person.

10. A people counting system according to claim 8, wherein each image processor comprises a respective second processing module which is configured to respond to the opt-out request by transmitting to the first processing module updates of the presence count at a first rate, and updates of the person location identifiers for the opted-out person at a second, slower rate.

11. A people counting system according to claim 1, wherein the opt-out request defines a time period within which the person is opted-out.

12. A method of opting out of a people counting system comprising:
   receiving image data relating to images of an area captured by at least one image capture device;
   processing the image data to extract information relating to people in the area to estimate the total number of people in the area;
   receiving from a user device associated with one of the people in the area an opt-out request associated with that person; and
   controlling the processing of the image data responsive to the opt-out request to stop extracting information relating to the person associated with the opt-out request,
   wherein a respective beacon controller is associated with a respective luminaire and configured to transmit a measurement signal to the user device associated with the opted-out request, whereby the user device computes an estimate of its location based on measurement signals from at least two beacon controllers, and generates an opt-out request comprising the estimate of its location.

\* \* \* \* \*